(12) United States Patent
Losasso Petterson et al.

(10) Patent No.: US 7,436,405 B2
(45) Date of Patent: Oct. 14, 2008

(54) TERRAIN RENDERING USING NESTED REGULAR GRIDS

(75) Inventors: Frank William Losasso Petterson, Palo Alto, CA (US); Hugues H. Hoppe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 136 days.

(21) Appl. No.: 10/846,897

(22) Filed: May 14, 2004

(65) Prior Publication Data

US 2005/0253843 A1 Nov. 17, 2005

(51) Int. Cl.
*G06T 17/00* (2006.01)
(52) U.S. Cl. .......................... 345/428; 345/423
(58) Field of Classification Search ................ 345/428
See application file for complete search history.

(56) References Cited

U.S. PATENT DOCUMENTS

| | | | |
|---|---|---|---|
| 5,367,615 A * | 11/1994 | Economy et al. ............ 345/441 |
| 5,699,497 A | 12/1997 | Erdahl et al. |
| 6,128,019 A | 10/2000 | Crocker, III et al. |
| 6,222,555 B1 * | 4/2001 | Christofferson et al. ..... 345/428 |
| 6,348,921 B1 * | 2/2002 | Zhao et al. ................. 345/428 |
| 6,417,860 B1 * | 7/2002 | Migdal et al. .............. 345/582 |
| 6,747,649 B1 * | 6/2004 | Sanz-Pastor et al. ........ 345/428 |
| 6,850,235 B2 * | 2/2005 | Levanon et al. ............ 345/423 |
| 2002/0190988 A1 * | 12/2002 | Maillot et al. .............. 345/428 |

OTHER PUBLICATIONS

Foley, J., van Dam, A., Feiner, S., Hughes, J., Computer Graphics: Principles and Practice, 1990, Addison-Wesley Longman Publishing Co., Inc., 2nd ed., pp. 727-728.*
Losasso et al., "Geometry Clipmaps: Terrain Rendering Using Nested Regular Grids," ACM Transactions of Graphics, vol. 23, No. 3, Aug. 3004, 8 pages.
Wang et al., "View-Dependent Displacement Mapping," ACM Transactions on Graphics, vol. 22, No. 3, Jul. 2003, pp. 334-339.
U.S. Appl. No. 09/115,583, filed Jul. 14, 1998, Hoppe.
U.S. Appl. No. 10/755,206, filed Jan. 9, 2004, Sander et al.
Hoppe, Hugues; Smooth View-Dependent Level-of-Detail Control and its Application to Terrain Rendering; undated; 9 pages.

(Continued)

*Primary Examiner*—Kee M. Tung
*Assistant Examiner*—Said Broome
(74) *Attorney, Agent, or Firm*—Klarquist Sparkman, LLP

(57) ABSTRACT

Plural levels of detail of a terrain are stored in memory in regular grids. In one such example, a terrain is cached in a set of nested regular grids obtained from the plural levels as a function of distance from a viewpoint. In one such example, the plural levels of detail of terrain comprise terrain elevation and texture images. If the viewpoint moves relative to the terrain, the nested regular grids are incrementally refilled relative to the viewpoints movement in the terrain. In one such example, a transition region is introduced to help blend between grid levels. The regular grids are stored as vertex buffers in video memory in one example. In one such example, a vertex data includes an elevation values from another grid level for efficient grid level boundary blending.

19 Claims, 9 Drawing Sheets

OTHER PUBLICATIONS

Cignoni, Paolo, et al.; Planet-Sized Batched Dynamic Adaptive Meshes (P_BDAM); undated; 8 pages.
Levenberg, Joshua; Fast View-Dependent Level-of-Detail Rendering Using Cached Geometry; undated; 7 pages.
Cignoni, P., et al.; BDAM—Batched Dynamic Adaptive Meshes for High Performance Terrain Visualization; Eurographics 2003, vol. 22, No. 3; 2003; 10 pages.
Lindstrom, Peter, et al.; Terrain Simplification Simplified: A General Framework for View-Dependent Out-Of-Core Visualization; IEEE Transactions on Visualization and Computer Graphics, vol. 8, No. 3, Jul.-Sep. 2002; pp. 239-254.
De Boer, Willem H.; Fast Terrain Rendering Using Geometrical MipMapping; E-mersion Project, Oct. 2000; pp. 1-7.
Blow, Jonathan; Terrain Rendering at High Levels of Detail; Mar. 11, 2000; 17 pages.
Cohen-Or, Daniel, et al.; Temporal Continuity of Levels of Detail in Delaunay Triangulated Terrain; 1996 IEEE; pp. 37-42.
Miller, Gavin S.P.; The Definition and Rendering of Terrain Maps; vol. 20, No. 4, ACM 1986; pp. 39-48.
De Floriani, Leila, et al.; Building and Traversing a Surface at Variable Resolution; 1997 IEEE; pp. 103-110.
Dogett, Michael; Adaptive View Dependent Tessellation of Displacement Maps; ACM 2000, pp. 59-67.
Dβllner Jergen, et al.; Texturing Techniques for Terrain Visualization; undated; pp. 227-235.
Duchaineau, Mark, et al.; ROAMing Terrain: Real-time Optimally Adapting Meshes; 1997 IEEE; pp. 81-88.
El-Sana, Jihad, et al.; Generalized View-Dependent Simplification; Eurographics '99, vol. 18, No. 3; pp. 1-13.
Fournier, Alain, et al.; Computer Rendering of Stochastic Models; ACM Jun. 1982, vol. 25, No. 6; pp. 371-384.
Gu, Xianfeng, et al.; Geometry Images; 2002 ACM; pp. 355-358.
Kobbelt, Leif, Interpolatory Subdivision on Open Quadrilateral Nets wtih Arbitrary Topology; Eurographics '96, vol. 15, No. 3; pp. C-409-C420.
Malvar, Henrique; Fast Progressive Image Coding without Wavelets; IEEE Data Compression Conference—Snowbird, Utah, Mar. 2000; pp. 1-10.
Moule, Kevin, et al.; Efficient Bounded Adaptive Tessellation of Displacement Maps; undated; 10 pages.
Röttger, Stefan, et al.; Real-Time Generation of Continuous Levels of Detail for Height Fields; undated; 8 pages.
Vlachos, Alex, et al.; Curved PN Triangles; undated; 8 pages.
Wagner, Daniel; Terrain Geomorphing in the Vertex Shader; undated; pp. 1-12.
Bishop, Lars, et al.; Designing a PC Game Engine; 1998 IEEE, Jan./Feb. 1998; pp. 2-9.
Cignoni, P., et al.; Representation and Visualization of Terrain Surfaces at Variable Resolution; Feb. 25, 1997; pp. 1-26.
Gumhold, Stefan, et al.; Multiresolution Rendering With Displacement Mapping; ACM 1999; pp. 55-66, 141.
Hoppe, Hugues, Optimization of Mesh Locality for Transparent Vertex Caching; ACM 1999; pp. 269-276.
Lefebvre, Sylvain, et al.; Pattern Based Procedural Textures; undated; 11 pages.
Lewis, J.P., Generalized Stochastic Subdivision; ACM Transactions on Graphics, Jul. 1987, vol. 6, No. 3; 23 pages.
Lindstrom, Peter, et al.; Real-Time, Continuous Level of Detail Rendering of Height Fields; 1996 ACM; 10 pages.
Losasso, F., et al.; Smooth Geometry Images; Eurographics Symposium on Geometry Processing (2003); 8 pages.
Pajarola, Renato, et al.; Large Scale Terrain Visualization Using the Restricted Quadtree Triangulation; 1998 IEEE; pp. 19-26, 515.
Rabinovich, Boris, et al.; Visualization of Large Terrains in Resource-Limited Computing Environments; 1997 IEEE; pp. 95-102.
Tanner, Christopher C., et al.; The ClipMap: A Virtual Mipmap; undated, 8 pages.
Wei, Li-Yi, et al.; Fast Texture Synthesis using Tree-structured Vector Quantization; 10 pages.
Williams, Lance; Pyramidal Parametrics; Computer Graphics, vol. 17, No. 3, Jul. 1983; pp. 1-11.
Dyn, Nira, et al.; A 4-point interpolatory subdivision scheme for curve design; Computer Aided Geometric Design 4 (1987); pp. 257-268.

* cited by examiner

FIG. 1
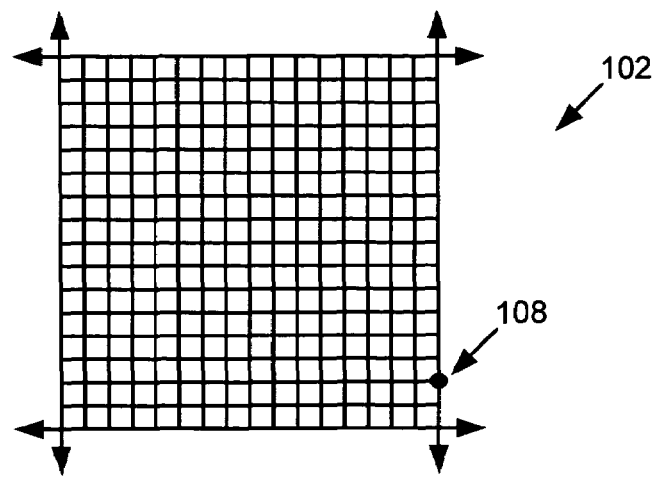
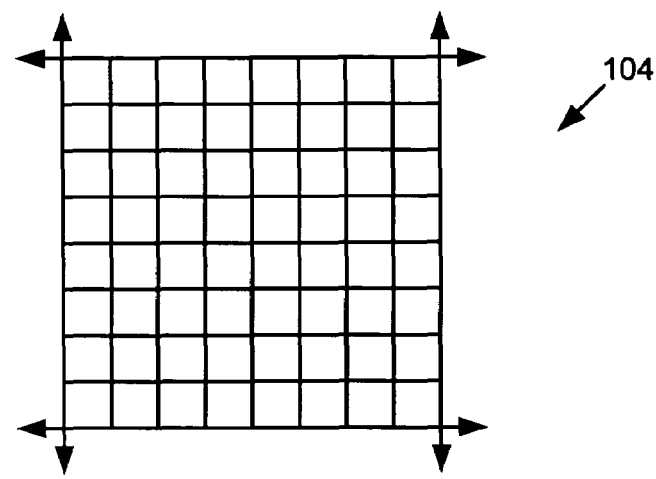
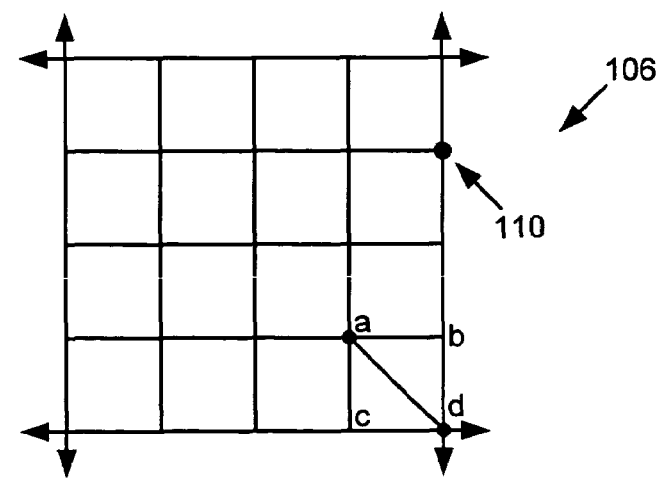

FIG. 8
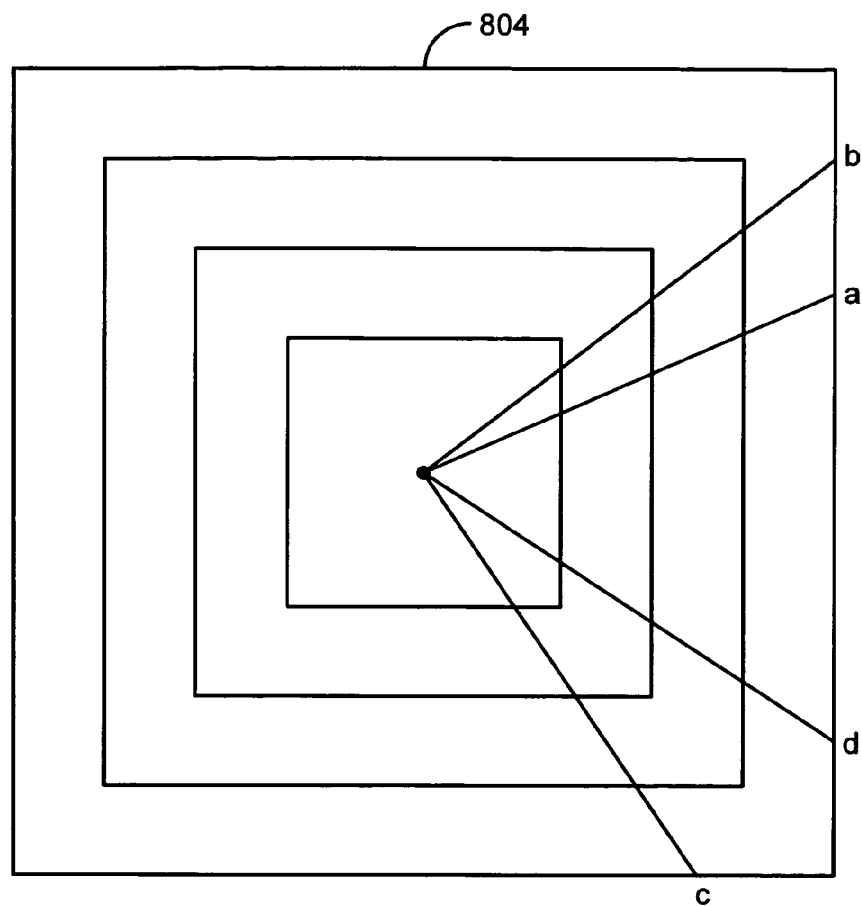
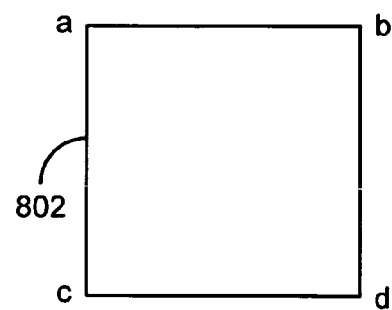

TERRAIN RENDERING USING NESTED REGULAR GRIDS

TECHNICAL FIELD

The invention relates generally to the field of terrain rendering with varied level of detail.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Existing terrain level-of-detail (LOD) algorithms use a hierarchy of mesh refinement operations to adapt the surface tessellation. These algorithms can be categorized by the structure of these hierarchies.

For example, irregular meshes such as triangulated irregular networks provide a good approximation of a terrain for a given number of triangle faces, but require the tracking of mesh adjacencies and refinement dependencies. Some hierarchies use Delaunay triangulations (see e.g., Cohen-Or, D. et al., Temporal Continuity of Levels of Detail in Delaunay Triangulated Terrain, IEEE Visualization 1996, 37-42; Cignoni, P. et al., Representation and Visualization of Terrain Surfaces at Variable Resolution, The Visual Computer 13(5), 199-217, 1997; Rabinovich, B. et al, Visualization of Large Terrains in Resource-Limited Computing Environments, IEEE Visualization 1997), while others allow arbitrary connectivities (see e.g., De Floriana E. et al., Building and Traversing a Surface at Variable Resolution, IEEE Visualization 1997, 103-110; Hoppe, H., Optimization of Mesh Locality for Transparent Vertex Caching, ACM SIG-GRAPH 1999, 269-276; El-Sans, J., et al., Generalized View-Dependent Simplification, Proceedings of Eurographics, 1999, 83-94).

Bin-tree hierarchies such as longest-edge bisection, restricted quadtrees, and hierarchies of right triangles use the recursive bisection of right triangles to simplify memory layout and traversal algorithms. However, these semi-regular meshes still involve pointer-based data structures and immediate-mode rendering (see e.g., Lindstrom, P. et al., Real-Time, Continuous Level of Detail Rendering of Height Fields, ACM SIGGRAPH 1996, 109-118; Duchaineau, M. et al., Roaming Terrain: Real-time Optimally Adapting Meshes, IEEE Visualization 1997, 81-88; Pajarola, R., Large Scale Terrain Visualization Using the Restricted Quadtree Triangulation, IEEE Visualization 1998, 19-26; Rottger, S. et al., Real-time Generation of Continuous Levels of Detail for Height Fields, Central Europe Conf. on Computer Graphics and Vis., 315-322; and Blow, J., Terrain Rendering at High Levels of Detail, Game Developers Conference 2000).

Further, Bin-tree regions define coarser-grain refinement operations on regions associated with a bin-tree structure, and pre-computed triangulated regions are uploaded to buffers cached in video memory, thereby boosting rendering throughput. However, caching hinders use of geomorphs for temporal coherence. See e.g., Levenberg, J., et al., Fast View-dependent Level-of-Detail Rendering Using Cached Geometry, IEEE Visualization 2002, 259-266; Cignoni, P. et al., BDAM—Batched Dynamic Adaptive Meshes for High Performance Terrain Visualization, Computer Graphics Forum 22(3) 2003; Cignoni, P. et al., Planet-sized Batched Dynamic Adaptive Meshes (P-BDAM), IEEE Visualization 2003. Many other methods have been proposed for view dependent mapping. See e.g., Bishop, L., et al., Designing a PC Game Engine, IEEE CG&A 18(1), 46-53 1998; De Boer, W., Fast Terrain Rendering Using Geometrical Mipmapping, http://www.flipcode.com/tutorials/geomipmaps.pdf, dated October 2000; Wagner, D., 2004, Terrain Geomorphing in the Vertex Shader, In ShaderX2: Shader Programming Tips & Tricks with DirectX 9, Wordware Publishing 2004; Gumhold, S. et al., Multiresolution Rendering with Displacement Mapping, Graphics Hardware Workshop 1999; Dogget, M. et al., Adaptive View-dependent Tessellation of Displacement Maps, Graphics Hardware Workshop, 2000; Moule, K. et al., Efficient Bounded Adaptive Tessellation of Displacement Maps, Graphics Interface, 2002. Other methods have been proposed for texture maps. See e.g., Doilner, J. et al., Texturing Techniques for Terrain visualization, IEEE Visualization 2000, 227-234; Tanner, C. et al., The Clipmap: A Virtual Mipmap, ACM SIG-GRAPH 1998, 151-158 ("Tanner 1998").

SUMMARY

The described technologies provide products, methods, and systems for level of detail variation in computerized terrain rendering. In one example, terrain rendering is provided via a technique herein referred to as geometry clipmaps. Geometry clipmaps are different from the prior methods in several ways. The refinement hierarchy consists of a set of nested, viewer-centered regular grids, with geomorphs providing inter-level continuity. The refinement criterion still considers viewer distance, but it ignores local surface geometry. Geometry clipmaps define a hierarchy centered about the viewer which simplifies inter-level continuity in both speed and time.

In one example, plural levels of detail of a terrain are stored in memory in regular grids. In one such example, a terrain is cached in a set of nested regular grids obtained from the plural levels as a function of distance from a viewpoint. If the viewpoint moves relative to the terrain, the nested regular grids are incrementally refilled relative to the viewpoint's movement in the terrain. In one such example, a transition region is introduced to help blend between grid levels. The regular grids are stored as vertex buffers in video memory in one example. In one such example, a vertex data set includes elevation values from another grid level for efficient grid level boundary blending.

In another example, a computer system provides plural levels of regular grids representing a terrain at various levels. In such an example, a rendering component nests portion of the regular grids into a nested regular grid which reduces in detail based on distance from a viewpoint. Many other examples and variations of rendering terrains with levels of detail are described.

Additional features and advantages will be made apparent from the following detailed description, which proceeds with reference to the accompanying drawings.

BRIEF DESCRIPTION OF THE DRAWINGS

FIG. 1 is a diagram illustrating levels of a clipmap.

FIG. 8 is a diagram of an exemplary diagram of a view frustum pyramid viewed from above.

DETAILED DESCRIPTION

Overview

Figure 2:
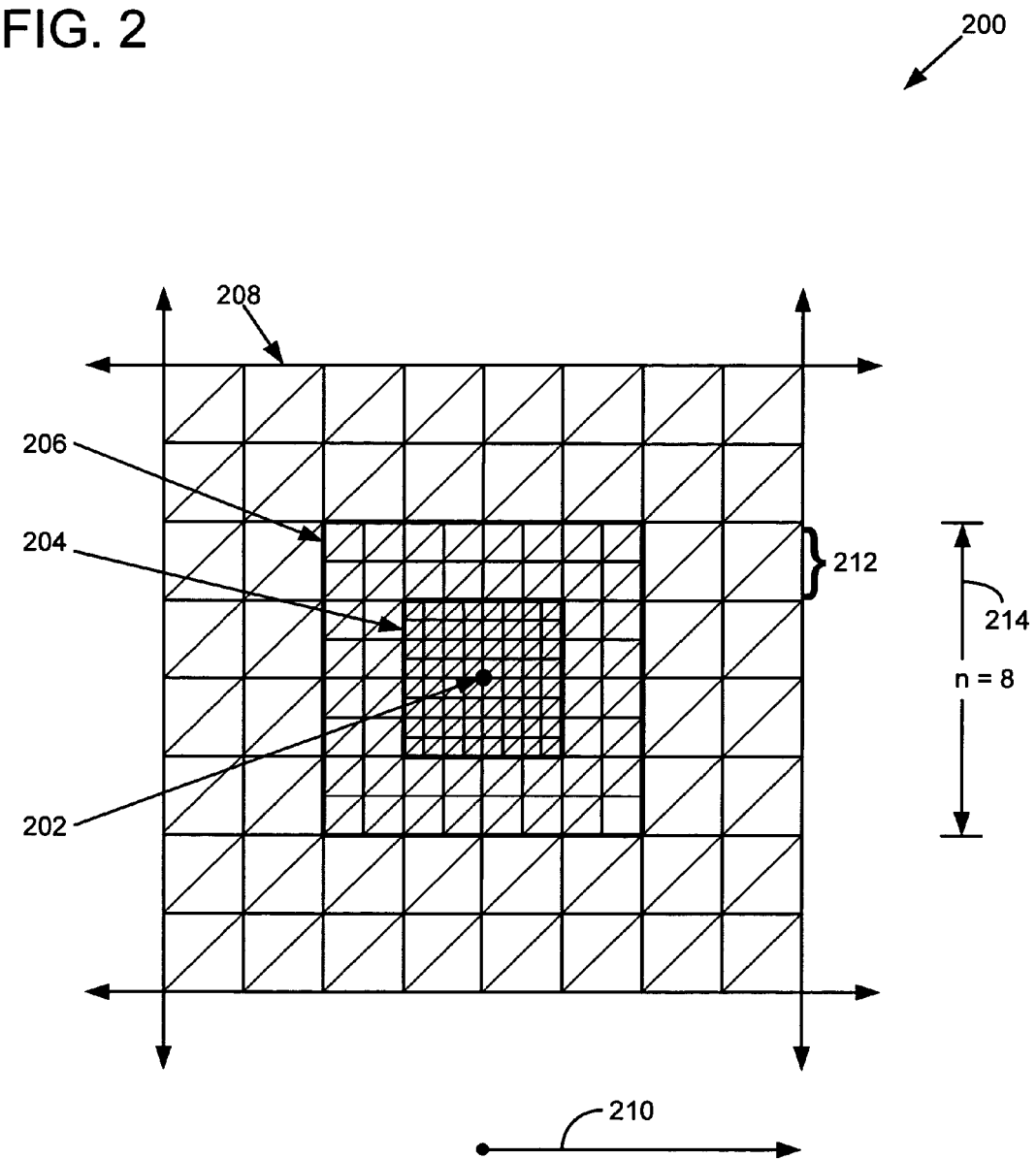
FIG. 2 is a diagram of exemplary nested geometry clipmaps.

Terrain geometry is an important component of outdoor graphics environments, as used for instance in movies, virtual environments, cartography, and games. In particular, real-time outdoor games include flight simulators, driving simulators, and massively multiplayer games. This technology focuses on the real-time rendering of terrain height-fields and provides efficiencies in terrain image rendering.

In order to demonstrate terrain rendering using geometry clipmaps in nested regular grids, a regular grid of an actual terrain is used. However, a regular grid of an imaginary terrain would work just as well. For example, one illustrative data set is a height field map of the United States containing a height sample taken every thirty meters in a regular grid.

FIG. 1 is a diagram representing levels of a clipmap. In this example, level 102 is the finest detail level of the terrain, and coarser detail levels of the terrain are created in intermediate levels 104 until a coarsest detail level is reached 106. The arrows on the corners of the terrain levels signify that an arbitrary terrain will often be very large in size. For example, the data set for United States contains 216,000×93,600 elevation samples. Elevation in a terrain is represented at the vertices 108, 110 of a terrain level. The coarser terrain levels 104, 106 provide efficiency since terrain elevations remote from but visible to a viewer does not need to be as detailed as terrain elevations near a viewer. The vertices of the terrain maps are used to create surfaces in the terrain. For example, a square surface is defined by the elevation samples defined by vertices a, b, c, and d. By providing more elevation samples (i.e., vertices) in the finer detail levels, more detailed surfaces can be created representing greater terrain detail. For example, a triangle surface (a.k.a., a triangle mesh) is represented by vertices a, b, and d. Texture images are applied to these surfaces to provide texture to the mesh surface.

As a viewpoint traverses a terrain, the terrain elevation and texture closest to the viewpoint is rendered from the finer levels of the terrain, while terrain elevation and texture details are obtained from coarser levels as the distance increases from the viewpoint.

In one example, portions of the levels of the geometry clipmap are stored as vertex buffers in fast video memory, and are incrementally refilled as the viewpoint moves. This provides visual continuity, uniform frame rate, complexity throttling, and graceful degradation.

Large terrain height maps often contain too many height samples to render interactively in real time. Moreover, rendering a uniformly dense triangulation can lead to aliasing artifacts, caused by an unfiltered many-to-one map from samples to pixels, as seen in texturing without mipmaps. Thus level-of-detail (LOD) control is provided to adjust the terrain tessellation as a function of the view parameters.

Previous schemes adapt refinement based not only on the view but also on the local terrain geometry. In these previous schemes, planar regions are assigned larger triangles, resulting in irregular meshes with fewer triangles to render. However, these frameworks have several shortcomings. The refinement criteria and/or refinement operations must be pre-computed and consume additional memory. The data structures involve random-access traversals with poor cache-coherence. Additionally, changing the tessellation requires slower immediate-mode rendering, while caching static regions hinders temporal continuity. Further, to maintain a constant frame rate, refinement thresholds must change with the bumpiness of the viewed terrain. Finally, surface shading requires texture images, which are stored separately and use an entirely different LOD structure.

Rendering rates in present GPUs provide enough throughput to fully cover a framebuffer with pixel-sized triangles at video rates. Moreover, vertex processing rates continue to increase as they catch up with pixel rates. Thus, the described technologies no longer assume that fine-grain LOD is essential, and instead seek a screen-uniform tessellation of the terrain where all triangles are roughly pixel-sized. The technology develops an LOD framework that optimally feeds the graphics pipeline.

FIG. 2 is a diagram of exemplary nested geometry clipmaps. A geometry clipmap caches a terrain in a set of nested regular grids centered about the viewer. These grids represent filtered versions of the terrain at power-of-two resolutions, and are stored as vertex buffers in video memory. As the viewpoint moves, the clipmap levels shift and are incrementally refilled with data.

There are some key differences between Geometry clipmaps and texture clipmaps. See, e.g., Tanner, C. et al., The Clipmap: A Virtual Mipmap, ACM SIG-GRAPH 1998, 151-158 ("Tanner 1998"); Williams, L., Pyramidal Parametrics, ACM SIGGRAPH 1983, 1-11.

Texture clipmaps compute LOD per-pixel after screen-space geometry is projected. With terrains however, the screen-space geometry does not exist until the terrain LOD is selected—a circular dependency. More importantly, per-pixel LOD selection would make it difficult to keep the mesh watertight and temporally smooth.

Instead, LOD in world space is selected based on viewer distance, using a set of nested rectangular regions about the viewpoint. Transition regions are created to smoothly blend between levels, and avoid T-junctions by stitching the level boundaries using zero-area triangles. The described LOD transition scheme allows independent translation of the clipmap levels, and lets levels be cropped rather than invalidated atomically as discussed in Tanner 1998. Additionally, the nested regular grids support texture images, thereby obtaining an unified LOD framework for geometry and images. Unlike texture clipmaps, the described technologies do not require special hardware.

The full terrain need not exist as regular grids in main memory. When the terrain is stored in compressed form, main memory may contain a compressed representation of the full terrain pyramid. In one such example, the levels are stored in the form of compressed residuals between successive levels. When terrain is synthesized, nothing is required to be stored in main memory for this purpose if the clipmap is cached. In one such example, a synthesis procedure fills the levels of the clipmap as the view is shifted.

Geometry Clipmap Overview

A geometry clipmap caches a terrain pyramid using a set of m levels, representing nested extents at successive power-of-two resolutions (e.g., FIG. 2). In one example, each level contains an n×n array of vertices, stored as a vertex buffer in video memory. To permit efficient incremental updates, the array is accessed toroidally (i.e., with 2D wraparound addressing using mod operations on x and y). In the near future, graphics hardware will also permit this 2D array of vertices to be stored as an image. In particular, a three-channel image where the 3 channels (red, green, blue) store the X, Y, Z locations of the vertices. In one such example, each vertex contains (x, y, z, $z_c$) coordinates, where z is the height value for this level and where $z_c$ is the height value at (x, y) in the next-coarser level, and is used for transition morphing discussed later.

Figure 3:
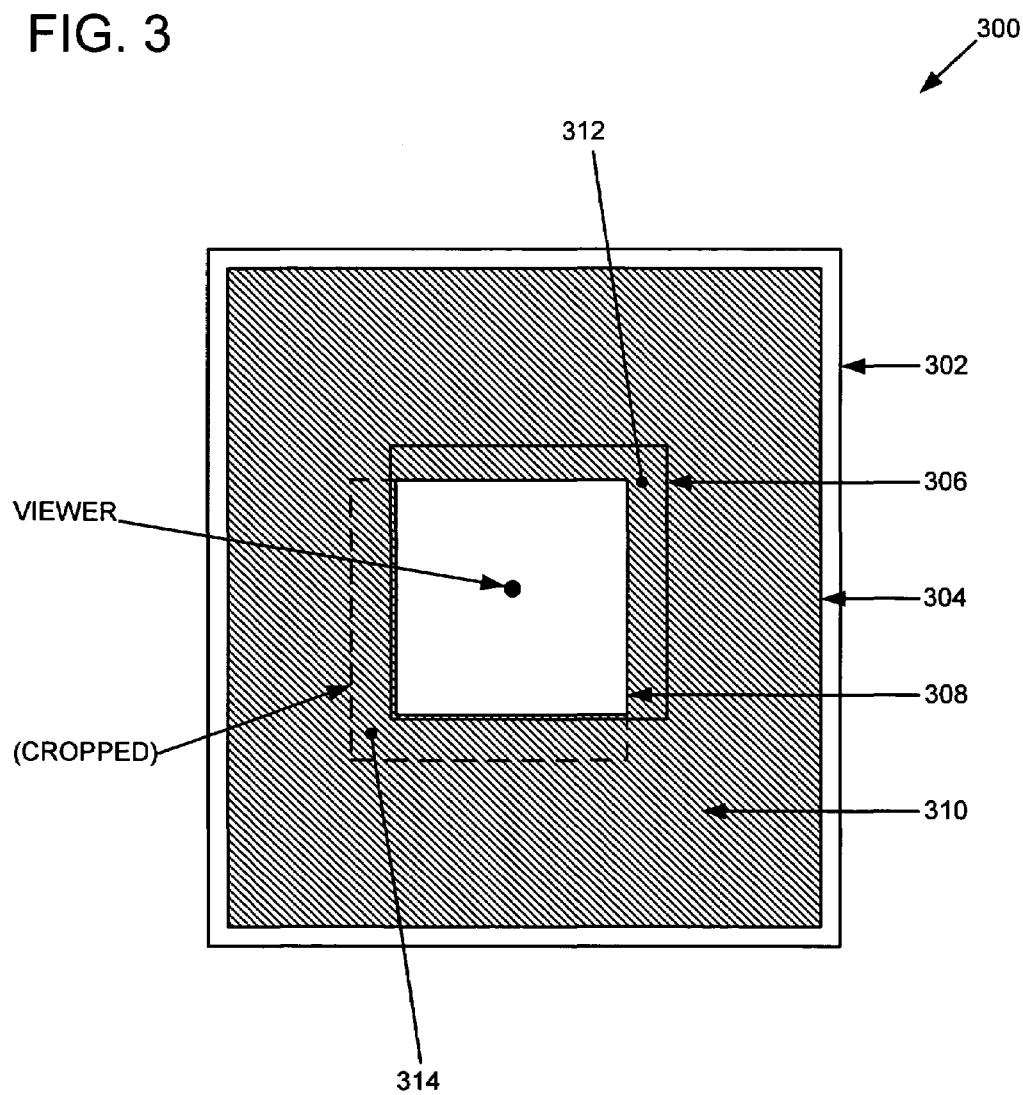
FIG. 3 is a diagram of an exemplary render region illustrating relationships between levels of a set of nested regular grids.

For each level l of the clipmap, a set of rectangular regions 300 is defined as shown in FIG. 3. The clip_region(l) 302 is the world extent described by the n×n grid at that level. The active_region(l) 304 is the extent of the subset that is rendered. As discussed later, the desired active region is centered at the viewer, but the clip region can fall behind, resulting in cropping of the active region. The clip_region(l+1) 306 of the next finer level also has an active_region(l+1) 308. Finally, the render_region(l) 310 of this level is defined as: render_region(l)=active_region(l)−active_region(l+1). For the finest level m, active_region(m+1) is defined to be empty. The active and clip regions are updated as the view changes as described below in the "Computation of Active Regions" and the "Geometry Clipmap Update".

The following observations are made with respect to FIG. 3.

(1) clip_region(l+1) ⊆ clip_region(l) ⊖1, where ⊖denotes erosion by a scalar distance. The clip regions are nested because the finer level values are predicted from the coarser ones during either decompression or synthesis. The prediction requires maintaining 1 grid unit on all sides.

(2) active_region(l) ⊆ clip_region(l), since the rendered data is a subset of the data present in the clipmap.

(3) the perimeter of active_region(l) lies on "even" vertices (as discussed at FIG. 6), to enable a watertight boundary with coarser level l−1.

(4) active_region(l+1) ⊆ active_region(l) ⊖2, since the render region is at least two grid units wide to allow a continuous transition between levels.

In one example, each clipmap level also contains associated texture image(s). An 8-bit-per-channel normal map is stored for surface shading, since this is more efficient than storing per-vertex normals. For faithful shading, the normal map has twice the resolution of the geometry, since one normal per vertex is too blurry. In one example, the normal map is computed from the geometry when the clipmap is updated. Additional images, such as color fields or terrain attributes are stored, possibly at different resolutions. Like the vertex arrays, textures are accessed toroidally for efficient update. In one example, for use in view-frustum culling discussed later, $z_{min}$, $z_{max}$ elevation bounds are maintained for the local terrain within each clipmap level.

Figure 4:
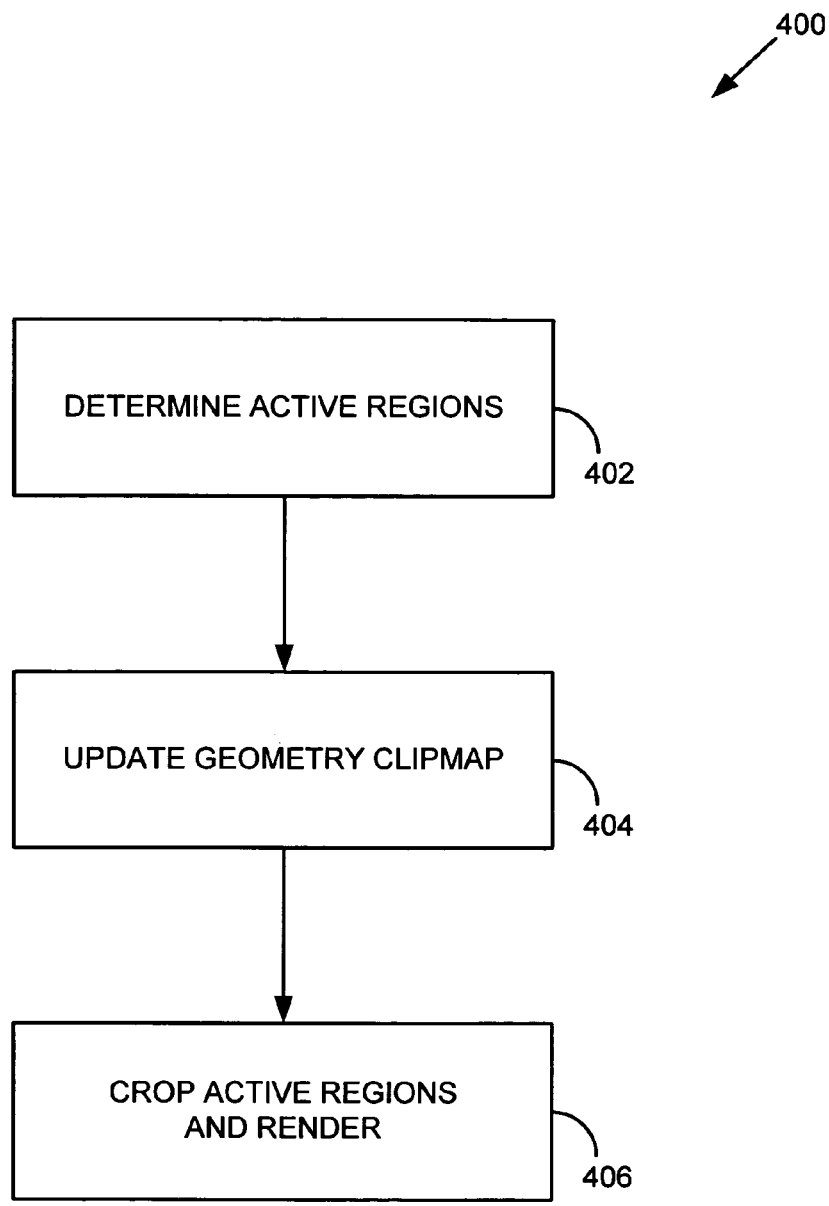
FIG. 4 is a flow chart of an exemplary method for rendering frames.

FIG. 4 is a flow chart of an exemplary method 400 for rendering frames. In one example, the following method is performed each frame. In one example, at 402, the method determines active regions for levels of the clipmap. In general, a finer grain level of the clipmap is selected for terrains closest to a viewpoint. For example, as shown in FIG. 2, a viewpoint 202 is determined to be closest to a given level of the clipmap terrain. Thus, a finer level of the clipmap terrain 204 is used to display the terrain closest to the viewer. As the distance from the viewer 202 increases 210, coarser levels of the clipmap 206, 208 are used. Another example of determining active regions is discussed below (i.e., Determine Active Regions).

At 404, as the viewpoint moves relative to the clipmap, the clipmap geometry is updated. As the viewpoint moves relative to the terrain, the clipmap boundary levels adjust so that levels surrounding the viewpoint generally maintain the relationship shown in FIG. 2—namely the view closest to the viewpoint is populated with data from the finer clipmap levels. Thus, in a trip from Kansas to North Carolina, the terrain unfolding in front of the viewpoint has an evolving front. As shown in FIG. 2, as the viewpoint moves 210, the terrain from each level of the clipmap evolves, so the viewpoint remains near the center of the clipmaps. It is helpful to keep the viewpoint centered as shown, especially in situations where the viewer may spin around and look backward. Another example of updating the clipmap is discussed below (i.e., Geometry Clipmap Update).

At 406, the active regions are cropped to the clip regions and the clipmaps are rendered. Another example of this step is discussed below (i.e., Rendering Algorithm).

Determine Active Regions

View-dependent refinement is determined by the selection of active regions for each level of the clipmap. In one example, for each level l, with grid 212 spacing $g_l=2^{-l}$ in world space, the desired active region is the square of size $ng_l \times ng_l$ 214 centered at the (x,y) location of the viewpoint 202. In other words, a desired clipmap is re-centered at the viewer, and preferably the full extent of each level is rendered. Now, consider how screen-space triangle size varies with the choice of clipmap size n. For now it is assumed that the terrain has small slope, so that each triangle is approximately a right triangle with side length $g_l$. A more general error analysis is discussed below (i.e., Results and Discussions).

For any visible world point, screen-space size is inversely proportional to depth in screen space. If the view direction is horizontal, screen-space depth is measured in the XY plane. The viewer lies at the center of render_region(l), which has outer edge size $ng_l$ and an inner edge size $ng_l/2$. For a field-of-view $\phi=90°$, the average screen-space depth (over all view directions) is about $(0.4) ng_l$. Thus, the approximate screen-space triangle size s in pixels is given by $$s = \frac{g_l}{(0.4) ng_l} \frac{W}{2\tan\frac{\varphi}{2}} = (1.25)\frac{W}{n\tan\frac{\varphi}{2}},$$

where W is the window size and p is the field of view. For a default W=640 pixels and $\phi=90°$, a clipmap size n=255 obtains good results. This corresponds to a screen-space triangle size s of 3 pixels. Since the normal maps are stored at twice the resolution, this gives approximately 1.5 pixels per texture sample, which is a reasonable setting for texture sampling.

When the view direction is not horizontal, the screen-space depth of render_region(l) is larger than the $(0.4) ng_l$ derived above, and therefore the screen-space triangle size becomes smaller than s. If the view looks straight down from high above the terrain, triangle size is tiny and aliasing becomes evident. The solution is to disable the rendering of unnecessarily fine levels. Specifically, the height of the viewer is computed over the terrain by accessing the finest valid level of the clipmap. For each level l, the active region is set to be empty if viewer height is greater than (0.4) $ng_l$.

One drawback of the simple viewer-centered regions is that the clipmap size n must grow as the field of view φ narrows. A remedy would be to adapt the location and size of clipmap regions to the view frustum. Instead, viewer-centered regions are used because they let the view instantly rotate about the current viewpoint. This is a requirement for many applications such as flight simulators that let the user look in all directions using a joystick "hat switch". Below, View Frustum Culling describes how to avoid rendering terrain that is outside the viewport.

Geometry Clipmap Update

As the desired active regions shift with the viewer's motion, the clip regions should also shift accordingly. In one example, with toroidal access, the old data does not need to be copied when shifting a level. When a clip region is translated, the newly exposed L-shaped region is filled with data, which comes from either decompression of explicit terrain or synthesis of procedural terrain as discussed below in "Terrain Compression" and "Terrain Synthesis". In one example, coarser levels 314 are filled from decompressed terrain, and finer levels are synthesized 312.

One variation would be to anticipate future viewer motion when translating the clip regions in order to reduce the frequency of updates. Because both decompression and synthesis can be performed efficiently on small regions, the granularity of updates is not currently an important factor.

When the viewer is moving fast, the processing needed to update all levels can become expensive. Thus, levels are updated in coarse-to-fine order, and updates are stopped upon reaching a given processing budget. In one example, it was determined to be efficient to stop after the total number of updated samples exceeds $n^2$. Because the clip regions in the non-updated (finer) levels fall behind, they gradually crop the associated active regions until these become empty. The effect is that the fast-moving (near-viewer) terrain loses its high-frequency detail, which works well. An interesting consequence is that rendering load actually decreases as the viewer moves faster.

When updating the clipmap using either compression or synthesis, the finer levels are predicted levels from the coarser levels using an interpolatory subdivision scheme. In one such example, the tensor-product version of the four-point subdivision curve interpolant is selected, which has mask weights $(-1/16, 9/16, 9/16, -1/16)$. See e.g., Kobbelt, L., Interpolatory Subdivision on Open Quadrilateral Nets with Arbitrary Topology, Eurographics 1996, 409-420; and Dyn, N., A 4-point Interpolatory Subdivision Scheme for Curve Design, CAGD 4, 257-268 1987.

Rendering Algorithm

Once the desired active regions are determined, the terrain is rendered using the algorithm shown in Table 1.

TABLE 1

```
// Crop the active regions.
for each level l ∈ [1,m] in coarse-to-fine order:
    Crop active_region(l) to clip_region(l)
    Crop active_region(l) to active_region(l-1) ÷2
```

TABLE 1-continued

```
//Render all levels
active_region(m+1) = ø          // boundary case
for each level l∈[1,m] in fine-to-coarse order:
    render_region(l) := active_region(l) – active_region(l+1)
    Render render_region(l)
```

According to this algorithm, the active regions are cropped to the clip regions and coarser active regions according to the conditions discussed above in the "Geometry Clipmap Overview". Note that if active_region(k) is empty, then by construction all finer active_region(l), l>k are also empty. It is quite common for the finer levels to have empty active regions, either because their clip regions have not been updated in time (i.e. the viewer is moving fast), or because finer tessellations are unwarranted (i.e. the viewer is sufficiently high above the terrain).

Since finer levels are closer to the viewer, levels are rendered in fine-to-coarse order to exploit any hardware occlusion culling.

Figure 5:
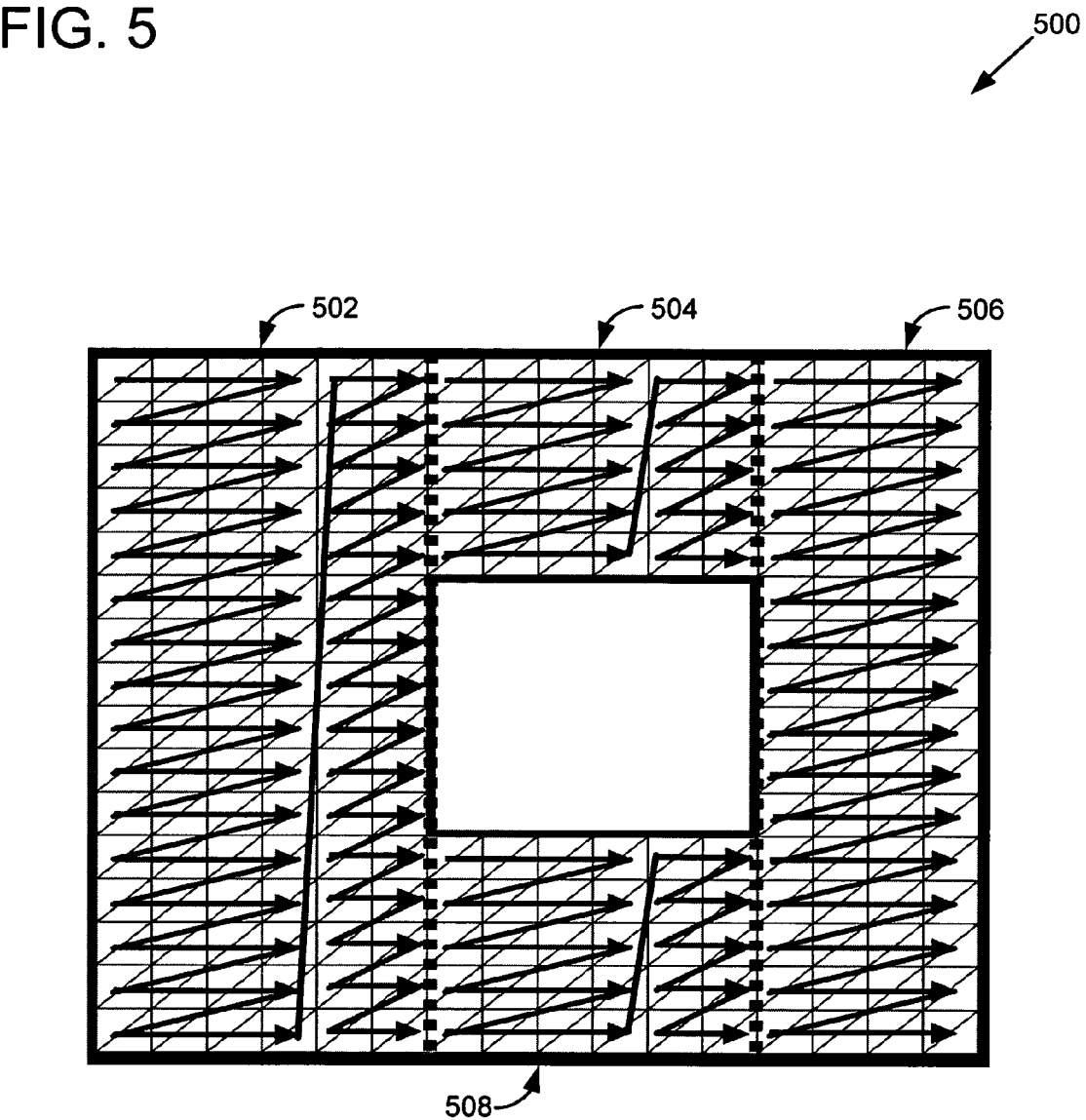
FIG. 5 is a diagram of an exemplary render region being rendered with optimal vertex caching.

FIG. 5 is a diagram of an exemplary render region being rendered with optimal vertex caching.

In one example, the render_region(l) is partitioned into 4 rectangular 502-508 regions which are rendered using triangle strips as illustrated in FIG. 5. The maximum strip length is selected for optimal vertex caching, and strips are grouped together to form large batched primitives. In practice, the strips are up to ~20 triangles in length. The grid-sequential memory accesses behave well at all levels of the video memory hierarchy.

Transition Regions for Visual Continuity

The algorithm described so far does not account for gaps between the render regions at different levels, due to the power-of-two mismatch at the boundaries.

Figure 6:
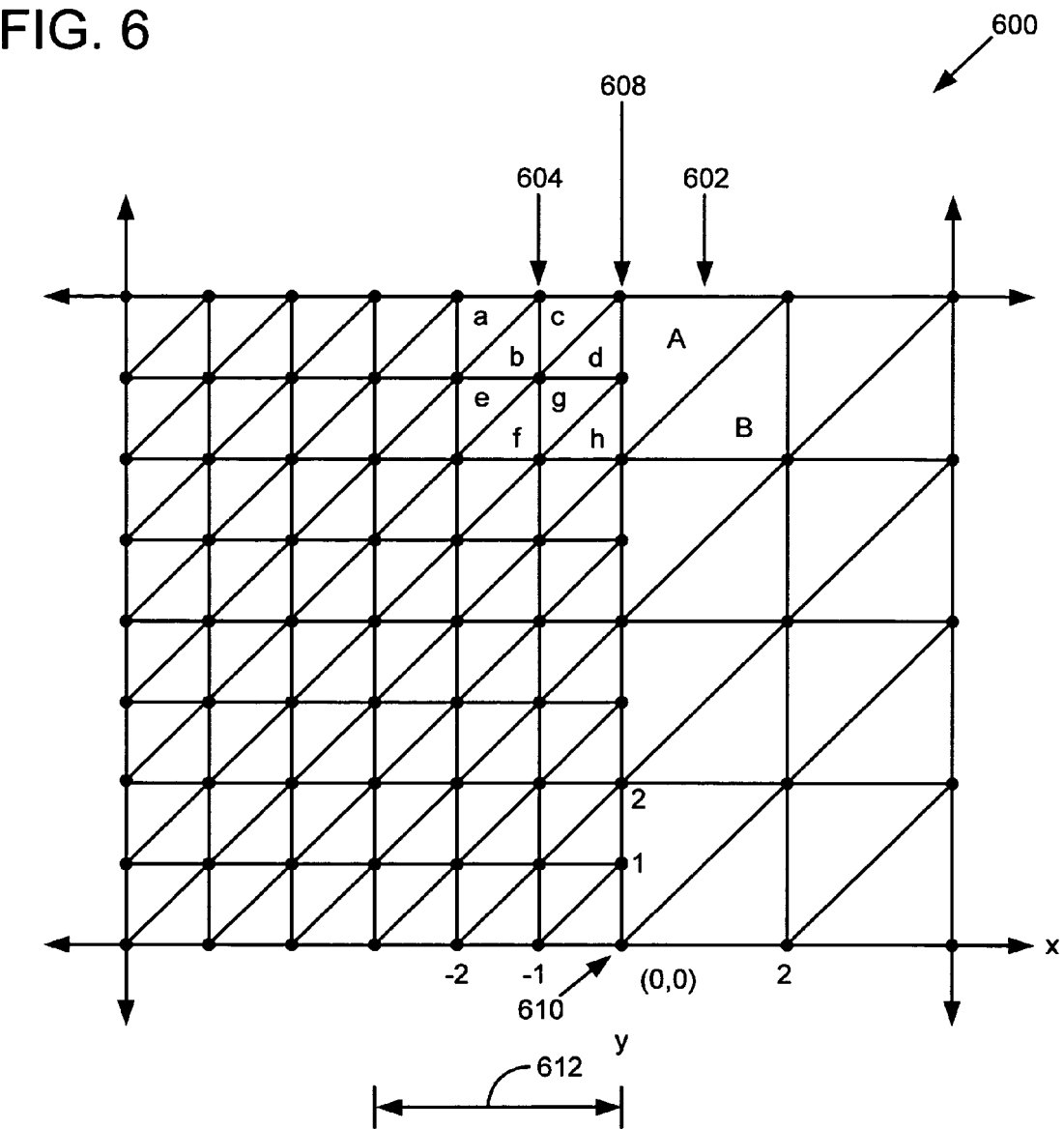
FIG. 6 is a diagram of an exemplary border between nested clipmap levels.

FIG. 6 is a diagram of an exemplary border between clipmap levels. For example, nested clipmaps have borders 608 where finer levels of the clipmap meet coarser levels. As discussed, a finer grain level 604 is typically closer to a viewpoint where greater triangle mesh complexity is used. As shown, a coarser grained grid 602 has four vertices that can be used to define two triangles A and B. This is contrasted with its adjacent finer grained grid 604 which has nine vertices that are used to define eight triangles a-h. As would be expected, this boundary between finer and coarser meshes, provides visual gaps that might be visible to a user.

Thus, the finer grain level is migrated to the coarser grained as the finer grained mesh gets closer to the level boundary 608. This migration between levels is done to the vertices of the finer grained level so that upon reaching the coarser level, the transition will not be apparent to a viewer. In order to demonstrate this concept, the level boundary 608 is labeled with a vertical y axis and a horizontal x axis centered at the x=0, y=0, vertex (0,0) 610. Notice that the vertices of the coarser level all fall on even x and even y vertex values of the graph (i.e., (0,0), (0,2), (2,0), (2,2), etc. Also notice that the vertices of the finer level fall on both odd and even x and y vertex values (i.e., even: (0,0), (−2,0), (0,2), (−2,2); odd: (0,−1), (0,1), (−1,1), (−2,1), (−1,2)). Thus, if a transition width is set equal to three grids 612, then the odd vertices of finer level will transition to their down sampled values of the coarser grid below them. Upon reaching the boundary 608, the transition to the down samples should be complete, so that the terrain height value of an odd point on the coarser level (0,1), is equal to the midpoint on the adjacent triangle of the finer level (i.e., the midpoint of (0,0) and (0,2)).

Figure 7:
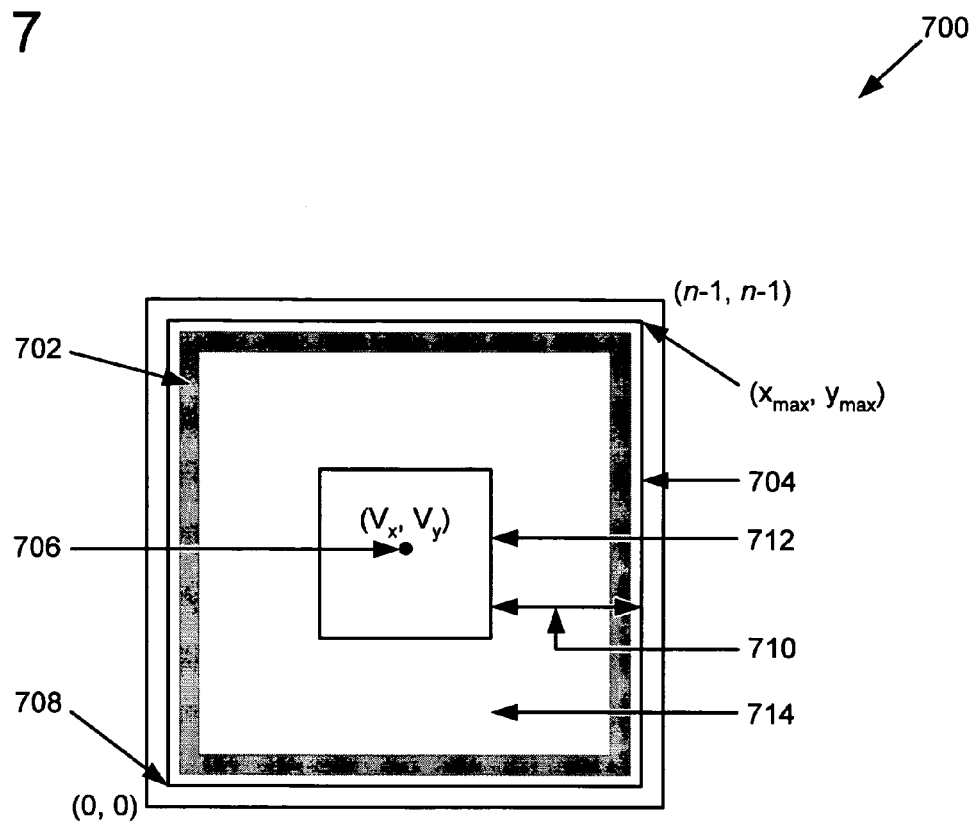
FIG. 7 is a diagram of an exemplary nested clipmap including a transition region.

FIG. 7 is a diagram of an exemplary nested clipmap including a transition region. The transition_region(l) 702 is shown in FIG. 7. To both eliminate the gaps and provide temporal continuity, the geometry is morphed near the outer boundary of each render_region(l) 714 such that it transitions to the geometry of the coarser level smoothly. The morph is a function of the spatial (x,y) 708 grid coordinates of the terrain vertices relative to those of the viewpoint $(v_x, v_y)$ 706. Thus the transition is not time-based but instead tracks the continuous viewer position 706.

Through experimentation, it was determined that a min_width(l) 710 transition width w of n/10 grid units works well. If w is much smaller, the level boundaries become apparent. And if w is much larger, fine detail is lost unnecessarily. If the finer active_region(l+1) 712 is too close to the coarser region, then it may be helpful to set w=min(n/10, min_width(l)), where min_width(l) is known to be at least 2.

Recall that each vertex stores (x, y, z, $z_c$), where $z_c$ is the terrain height in the next-coarser level l−1. During transition regions, the morphed elevation of vertex values are determined as follows:

$$z' = (1-\alpha)z + \alpha z_c$$

where a blend parameter $\alpha$ is computed as $\alpha = \max(\alpha_x, \alpha_y)$ with $$\alpha_x = \min\left(\max\left(\left(|x - v_x^l| - \left(\frac{x_{\max} - x_{\min}}{2} - w - 1\right)\right)/w, 0\right), 1\right)$$

and similarly for $\alpha_y$. Here $(v_x^l, v_y^l)$ denote the continuous coordinates of the viewpoint in the grid of clip_region(l), and $x_{min}$ and $x_{max}$ the integer extents of active_region(l) 704. The desired property is that $\alpha$ evaluates to 0 except in the transition region where it ramps up linearly to reach 1 at the outer perimeter. These evaluations are performed in the GPU vertex shader using about 10 instructions, so they add little to the rendering cost. Thus, a transition region near the outer boundary lets a timer level l smoothly blend with the next coarser level l−1.

Although the geometry transitions eliminate gaps, the T-junctions along the boundaries still result in dropped pixels during rasterization in some examples. To stitch adjacent levels into a watertight mesh, zero-width triangles are rendered along the render region boundaries.

Texture Mapping

As previously stated, each clipmap level also stores texture images for use in rasterization (e.g., a normal map). One option for texture mapping would be to let hardware mipmapping control texture LOD. The texture at each clipmap level would have its own mipmap pyramid, thus requiring 33% more memory. Note that the coarser mipmap levels in this pyramid correspond exactly with sub-regions in coarser clipmap levels, so ideally they should be shared as in texture clipmaps (see e.g., Tanner 1998), but the present hardware does not support this capability. More significantly, there is a practical problem with letting the hardware control the mipmap level. If the resolution of the stored texture is not sufficiently high, a sharp transition in texture resolution becomes evident at the render region boundaries in some cases, because the mipmap level has not reached the next coarser level. These sharp transitions are visible during viewer motion as "advancing fronts" over the terrain surface.

Instead, mipmapping is disabled altogether, and LOD is performed on the texture using the same spatial transition regions applied to the geometry. Thus texture LOD is based on viewer distance rather than on screen-space derivatives as in hardware mipmapping. The main element lost in this approximation is the dependence of texture LOD on surface orientation. When a surface is oriented obliquely, one can no longer access a coarser mipmap level to prevent aliasing. However, graphics hardware commonly supports anisotropic filtering, whereby more samples are combined from the original finest level. Consequently, the absence of mipmaps is not a practical issue for surface orientation dependence.

The spatially based texture LOD scheme is easily implemented in the GPU fragment shader. When rendering level l, the shader is provided with the textures from levels l and l−1, and these are blended using the same $\alpha$ parameter already computed in the vertex shader for geometry transitions.

View-Frustum Culling

FIG. 8 is a diagram of an exemplary diagram of a view frustum pyramid viewed from above. Recall from FIG. 5, that each render region is partitioned into 4 rectangular regions. Also, recall that for levels of the clipmap, $z_{min}$ and $z_{max}$ bounds are maintained for local terrain. Each 2D rectangular extent is extruded by the terrain bounds [$z_{min}, z_{max}$] to form an axis-aligned bounding box. This box is intersected with the 4-sided pyramid of the view frustum, and the resulting convex set is projected into the XY plane. For example, for a screen view 802 represented by screen terminal coordinates a-d, the corresponding extents intersected from this screen position are shown in an exemplary nested grid 804, labeled with the same screen coordinates a-d. The axis-aligned rectangle bounding this set is used to crop the given rectangular region. View frustum culling reduces rendering load by a factor of about 3 for a 90° field of view.

Terrain Compression

Height maps are remarkably coherent in practice, significantly more so than typical color images, and thus offer a huge opportunity for compression. To interact efficiently with the geometry clipmap structure, the decompression algorithm must support "region-of-interest" (ROI) queries at any power-of-two resolution.

The following describes a pyramid compression scheme. A terrain pyramid $T_l \ldots T_m$ is first created by successively downsampling the fine terrain $T_m$ into coarser levels using a linear filter $T_{l-1} = D(T_l)$. Then, each pyramid level $T_l$ is predicted from its next coarser level $T_{l-1}$ through interpolatory subdivision $U(T_{l-1})$ (e.g., as discussed in "Geometry Clipmap Update"), and the residual $R_l = T_l - U(T_{l-1})$ is compressed using an image coder. The optimal filter D (of size 11×11) is precomputed such that $U(D(T_l))$ gives the best $L^2$ approximation of $T_l$, by solving a linear system on a subset of the given terrain. Since the compression is lossy, $R_l$ is approximated by $\tilde{R}_l$. Therefore, the levels in coarse-to-fine order are reconstructed as $\tilde{T}_l = U(\tilde{T}_{l-1}) + \tilde{R}_l$, and the residuals are compressed and redefined as $R_l = T_l - U(\tilde{T}_{l-1})$.

Since coarser levels are viewed from afar, the first approach was to give their approximations $\tilde{T}_l$ less absolute accuracy. Specifically, the residuals $R_l$ were scaled by $2^{l-m}$ prior to quantization. While this is a correct argument for geometric fidelity, it was discovered that this results in poor visual fidelity, because both the normal map and z-based coloring then present quantization artifacts (since they are inferred from the decompressed geometry). The solution is to compress all level residuals with the same absolute accuracy.

The quantized residuals are compressed using a PTC image coder (e.g., Malvar, H., Fast Progressive Image Coding without Wavelets, Data Compression Conference 2000, 243-252), which have several nice properties. They avoid blocking artifacts by defining overlapping basis functions, yet the bases are spatially localized to permit efficient regional decompression. Also, the coder supports images of arbitrary size when the encoding fits within 2 GB. In one example, decompression takes place during the incremental uploads to video memory, and is thus, sufficiently fast.

The compression preprocess is implemented within a 32-bit address space by performing all steps as streaming computations. For the 40 GB U.S. data, the complete procedure from original terrain $T_m$ to compressed residuals $R_l$ takes about 5 hours, much of which is disk I/O. The rms of the compression error $\mathcal{T}_m - T_m$ are discussed below in "Results and Discussion". The compressed terrain is visually indistinguishable from the original, except perhaps at the sharp color transition associated with the coastline.

Terrain Synthesis

The geometry clipmap provides a natural structure to generate new detail using either stochastic subdivision (see e.g., Fournier, A. et al., Computer Rendering of Stochastic Models, Comm. of the ACM 25(6), 371-384 1982; Lewis, J., Generalized Stochastic Subdivision, ACM Transactions on Graphics 6(3), 167-190, 1987) or multiresolution texture synthesis (see e.g., Wei, L. et al., Fast Texture Synthesis Using Tree-structured Vector Quantization, ACM SIGGRAPH 2000, 479-488). One constraint is that the synthesis process must be spatially deterministic, so that the same terrain is always created.

Fractal noise displacement is implemented by adding uncorrelated Gaussian noise to the upsampled coarser terrain. The noise variance is scaled at each level l to equal that in actual terrain (i.e., the variance of the residuals $^{R_l}$ computed in "Terrain Compression"). The $C^1$ smoothness of the interpolatory subdivision is key to avoiding surface crease artifacts (see e.g., Miller, G., The Definition and Rendering of Terrain Maps, ACM SIGGRAPH 1986, 39-48). For efficient evaluation, precomputed Gaussian noise values are stored within a table and indexed with a modulo operation on the vertex coordinates. A table size of 50×50 is sufficient to remove any repetitive patterns or recognizable banding.

It is desirable to implement the synthesis process using GPU fragment shaders, so that the geometry data would remain entirely in video memory. GPUs already have the required "render-to-vertex" capability, and it should be exposed shortly. For now the CPU provides the computation time as shown in Table 3.

Procedural synthesis allows the generation of terrains with infinite extent and resolution, and therefore offers tremendous potential. Additionally, fractal noise provides synthesized landscapes.

Results and Discussion

Experiments have included two US government samples. The smaller one is a $16,385^2$ grid of the Puget Sound area at 10 m spacing, with 16-bit height values at 1 m vertical resolution. The full-resolution grid is assigned to level l=9, such that it has $65^2$ extent at the coarsest level l=1. The data compresses from 537 MB to 8.7 MB, with an rms error of 1.2 m (PSNR=20 $\log_{10}(z_{max}/\text{rms})$=71.4 dB).

The larger dataset is a height map of the conterminous United States at 30 m spacing (more precisely, 1 arc-sec in both longitude and latitude). Its extents are [126°W,66°W]× [24°N,50°N], thus forming a 216,000×93,600 grid. In a clipmap with m=11 levels, it occupies a 212×93 rectangle at the coarsest level. (It is rendered flat even though it is parameterized by spherical coordinates.) It compresses from 40.4 GB to 353 MB, with an rms error of 2.6 m (PSNR=64.9 dB). A PC with a 3.0 GHz Pentium4 CPU, 1 GB system memory, and an ATI Radeon 9800XT GPU with 256 MB video memory was used.

There are two sources of error, compression error and LOD error, and we analyze these separately. The U.S. dataset is compressed from 40.4 GB to 353 MB, with an rms error of 2.6 m (PSNR=64.9 dB). The Puget dataset is compressed from 537 MB to 8.7 MB, with an rms error of 1.2 m (PSNR=20 $\log_{10}(z_{max}/\text{rms})$=71.4 dB). These rms errors are quite small—only about 10% of the sample spacing.

For the U.S. dataset, the number of levels is m=11, and the compressed terrain occupies 353 MB in system memory. For a default clipmap size n=255, the geometry clipmap needs 16 $mn^2$=11 MB in video memory for the vertex geometry. Since level prediction is not yet available on the GPU, the z height data is replicated in system memory, requiring 4 $mn^2$=3 MB. The normal maps have twice the resolution, but only 3 bytes/sample, so an additional 12 $mn^2$=9 MB is required. Thus, overall memory use is about 376 MB, or only 0.019 bytes/sample. As shown in Table 2, the space requirement is significantly less than in previously reported results. Since the data fits within the memory of a standard PC, we avoid runtime disk accesses are avoided.

For m=11 levels of size $255^2$, 120 frames/sec are obtained with frustum culling, at a rendering rate of 59 MΔ/sec. (With 4× framebuffer multisampling, it drops to 95 frames/sec.) The results suggest that prior LOD methods did not attain optimal rendering throughput.

In one example, the threshold processing budget for updating the clipmap was a full n×n level. Table 3 shows the execution times of the update steps for this worst case. It is likely that these times overlap with GPU processing. During viewer motion, the system maintains a nearly uniform rate of 60 frames/sec. Note that it will soon be possible to perform all steps (except for decompression) more efficiently using the GPU, thanks to the regular grid data structure.

For m=11 levels of size $255^2$, 120 frames/sec are obtained with frustum culling, at a rendering rate of 59 MΔ/sec. (With 4× frame buffer multisampling, it drops to 95 frames/sec.) The threshold processing budget for updating the clipmap is a full n×n level. Table 3 shows the execution times of the update steps for this worst case. It is likely that these times overlap with GPU processing. During viewer motion, the system maintains a nearly uniform rate of 60 frames/sec. Note that it will soon be possible to perform all steps (except for decompression) more efficiently using the GPU, thanks to the regular grid data structure.

TABLE 2

| LOD scheme | Grid size | Num. of samples | Runtime space | Bytes/sample |
|---|---|---|---|---|
| Hoppe [1998] | 4K × 2K | 8 M | 50 MB | 6.0 |
| Lindstrom [2002] | 16K × 16K | 256 M | 5.0 GB | 19.5 |
| Cignoni et al [2003a] | 8K × 8K | 64 M | 115 MB | 1.8 |

TABLE 2-continued

| LOD scheme | Grid size | Num. of samples | Runtime space | Bytes/ sample |
|---|---|---|---|---|
| Cignoni et al [2003b] | $6 \times 13313^2$ | 1 G | 4.5 GB | 4.5 |
| Geometry clipmaps | $16K \times 16K$ $216K \times 94K$ | 256 M 20 G | 28 MB 376 MB | 0.10 0.019 |

Table 2 is a comparison of runtime space requirements of prior methods. Prior methods also require storage of a normal map for surface shading (which is not included here). In geometry clipmaps, normal maps are computed as needed from the decompressed geometry.

TABLE 3

| Update step | Time (msec) |
|---|---|
| Computation of $z_c$ | 2 |
| Interpolatory subdivision U | 3 |
| Decompression, or Synthesis | 8 3 |
| Upload to video memory | 2 |
| Normal map computation | 11 |
| Total | 21 or 26 |

Table 3 compares times for updating a full n×n level (n=255), which is an example update processing budget.

For m=11 levels, floating-point precision is not yet an issue. To allow an arbitrary number of levels, a simple solution is to transform the viewpoint and view matrix into the local coordinate system of each clipmap level using double precision (see e.g., Cignoni, P. et al., Planet-sized Batched Dynamic Adaptive Meshes (P-BDAM), IEEE Visualization 2003).

Previously, the screen-space triangle size s was estimated for a given clipmap size n. The analysis relied on the fact that terrain triangles have compact shape if the terrain slope is assumed small. If instead the terrain has steep slope, triangles can become arbitrarily elongated and their screen-space extent is no longer bounded, which seems somewhat unsatisfactory.

However, the more relevant measure is the screen-space geometric error, i.e. the screen-projected difference between the rendered mesh and the original terrain. This error can be analyzed if knowledge of the spectral properties of the terrain geometry is provided.

For each terrain level $T_l$, the error function $e_l = PL(T_l) - PL(T_m)$ is interesting where PL denotes the piecewise linear mesh interpolant over the (x,y) domain. This function is related to the (continuous) spectral density of the terrain signal. Since the grid spacing $g_l$ in level l projects to s pixels in screen space, the screen-space projection of error $e_l(x,y)$ at location (x,y) is at most $$\hat{e}_l(x, y) = \frac{e_l(x, y)}{g_l} s.$$

(The error is smaller if the view direction is not horizontal.) Thus, given a terrain dataset, the norms of $\hat{e}_l$ are computed to estimate the screen-space error for each rendered level, as shown in Table 4.

The results reveal that the rms screen-space error is smaller than one pixel. This is not unexpected, since the triangle size s is only 3 pixels and the difference between those planar triangles and the finer detail is generally smaller yet. The larger $L^{28}$ (maximum) error values are misleading, because the acquired terrain data contains mosaic misregistration artifacts that create artificial cliffs, and it only takes one erroneous height value to skew the statistic. Instead, it is preferable to examine the $99.9^{th}$ percentile error, and see whether it too is still smaller than a pixel.

TABLE 4

| | Puget Sound | | | U.S. | | |
|---|---|---|---|---|---|---|
| Level l | rms($\hat{e}_l$) | $P_{.999}(\hat{e}_l)$ | max($\hat{e}_l$) | rms($\hat{e}_l$) | $P_{.999}(\hat{e}_l)$ | max($\hat{e}_l$) |
| 1 | 0.12 | 0.58 | 1.27 | 0.02 | 0.12 | 0.30 |
| 2 | 0.14 | 0.75 | 1.39 | 0.04 | 0.20 | 0.43 |
| 3 | 0.15 | 0.86 | 2.08 | 0.06 | 0.32 | 0.62 |
| 4 | 0.15 | 0.93 | 2.50 | 0.09 | 0.51 | 0.96 |
| 5 | 0.14 | 0.96 | 3.38 | 0.12 | 0.68 | 1.37 |
| 6 | 0.13 | 0.94 | 5.55 | 0.13 | 0.78 | 2.03 |
| 7 | 0.11 | 0.83 | 8.03 | 0.14 | 0.84 | 2.59 |
| 8 | 0.11 | 0.75 | 14.25 | 0.13 | 0.86 | 4.16 |
| 9 | 0.00 | 0.00 | 0.00 | 0.12 | 0.90 | 8.18 |
| 10 | | | | 0.11 | 0.90 | 11.70 |
| 11 | | | | 0.00 | 0.00 | 0.00 |

Table 4 is an analysis of screen-space geometric error, in pixels. Columns show rms, $99.9^{th}$ percentile, and maximum errors. (n=255, W=640, $\phi$=90°, i.e. s=3).

The error analysis suggests that perhaps the clipmap size could be reduced while still maintaining acceptable geometric fidelity. However, the true limiting factor is visual fidelity, which in turn strongly depends on surface shading—this is the basic premise of normal mapping. Therefore, even if coarser geometry is used, high-resolution normal maps would still need to be maintained. In our system, these normal maps are generated from the geometry clipmap itself. Indeed, the compressed mipmap pyramid can be seen as an effective scheme for encoding the normal map, with a secondary benefit of providing carrier geometry.

The non-uniformity of screen-space error $\hat{e}_l$ across levels could be exploited by adapting the sizes of individual clipmap levels. For instance, smooth hills would require a sparser tessellation (in screen space) on the nearby smooth terrain than on the farther hill silhouettes. As just discussed, one would have to verify that the surface shading is not adversely affected. Both the Puget Sound and U.S. terrain datasets appear to have nearly uniform spectral densities. In the U.S. data, the error begins to diminish at coarse levels, reflecting the fact that the Earth is smooth at coarse scale.

The compressed terrain pyramid residuals $R_l$ could be stored on a server and streamed incrementally (based on user motion) to a lightweight client. The necessary bandwidth is small since the compression factor is on the order of 50-100.

A pre-filtered mipmap pyramid is a natural representation for terrain data. Geometry clipmaps cache nested rectangular extents of this pyramid to create view-dependent approximations. A unique aspect of the framework is that LOD is independent of the data content. Therefore the terrain data does not require any precomputation of refinement criteria. Together with the simple grid structure, this allows the terrain to be created lazily on-the-fly, or stored in a highly compressed format. Neither of these capabilities has previously been available.

In one example, an interactive flight is displayed over a 20-billion sample grid of the U.S., stored in just 400 MB of memory and decompressed on the fly at 60 frames/sec. The decompressed data has an rms error of 2.6 meters. The screen-space LOD error has a 99.9th percentile smaller than a pixel, and the rendering is temporally smooth.

The representation of geometry using regular grids should become even more attractive with the forthcoming unification of vertex and image buffers. The vertex buffers will become geometry images (see e.g., Gu, X. et al., Geometry Images, ACM SIGGRAPH 2002, 355-361) accessed through 2D toroidal coordinates, and this will greatly simplify implementation of geometry clipmaps. More generally, the unification will enable the highly parallel GPU rasterizer to process geometry in addition to images.

Geometry clipmaps unify the LOD management of the terrain geometry and its associated texture signals. The spatially based LOD structure lets low-resolution textures be applied without visual discontinuities at level boundaries. Beyond runtime creation of normal maps, that non-local functions such as shadow maps are envisioned can be similarly computed in a lazy fashion.

Geometry clipmaps provide an opportunity for obtaining a number of advantages over previous terrain LOD schemes:
  Simplicity. As conducted for triangulation of irregular meshes, there is no traversal of pointer/index-based data structures, and no tracking of refinement dependencies.
  Optimal rendering throughput. The clipmap vertices reside in video memory, and their grid structure allows triangle-strip rendering with optimal vertex-cache reuse.
  Visual continuity. Inter-level transition regions provide spatial and temporal continuity for both geometry and texture, using a few instructions in the vertex and fragment programs respectively.
  Steady rendering. The rendering rate is nearly constant since the tessellation complexity is independent of local terrain roughness.
  Immediate complexity throttling. Even with a fixed clipmap size, the rendered regions can be fixed to reduce rendering load.
  Graceful degradation. When a viewer is moving quickly, the update bandwidth (to refill the clipmap) can become the bottleneck. As in texture clipmaps, as many levels as possible are updated within a prescribed budget. The effect is that fast-moving terrain is possible with lower frequency detail.
  Surface shading. Normal maps can be computed rapidly from the geometry as necessary and use the same LOD structure as the geometry.

Geometry clipmaps also enable two new runtime functionalities:
  Compression. Since only the clipmap needs to be expanded into vertex data, the remainder of the terrain pyramid can be stored in compressed form. Residuals between pyramid levels are computed using a 2D image coder. The high data coherence allows for compression factors around 50-100. Storing terrains entirely in memory avoids paging hiccups.
  Synthesis. The simple grid structure permits rapid terrain synthesis, so that coarsely specified geometry can be amplified by procedurally generated detail.
  Limitations. In some cases, the detail of the rendered mesh is more complex than in prior LOD schemes. Essentially, because the geometry clipmaps have uniform detail (everywhere and at all frequencies) and thus does not benefit from local adaptivity. On the other hand, the mesh is regular and resides in video memory, and thus delivers optimal rendering performance for this worst case. Another limitation is that the terrain is assumed to have bounded spectral density. For example, a tall needle-like feature would morph into view a little too late. Fortunately, practical terrains are well behaved and do not present such problems, and buildings, vegetation, and other objects that populate the environment are rendered separately using other LOD techniques.

Computing Environment

Figure 9:
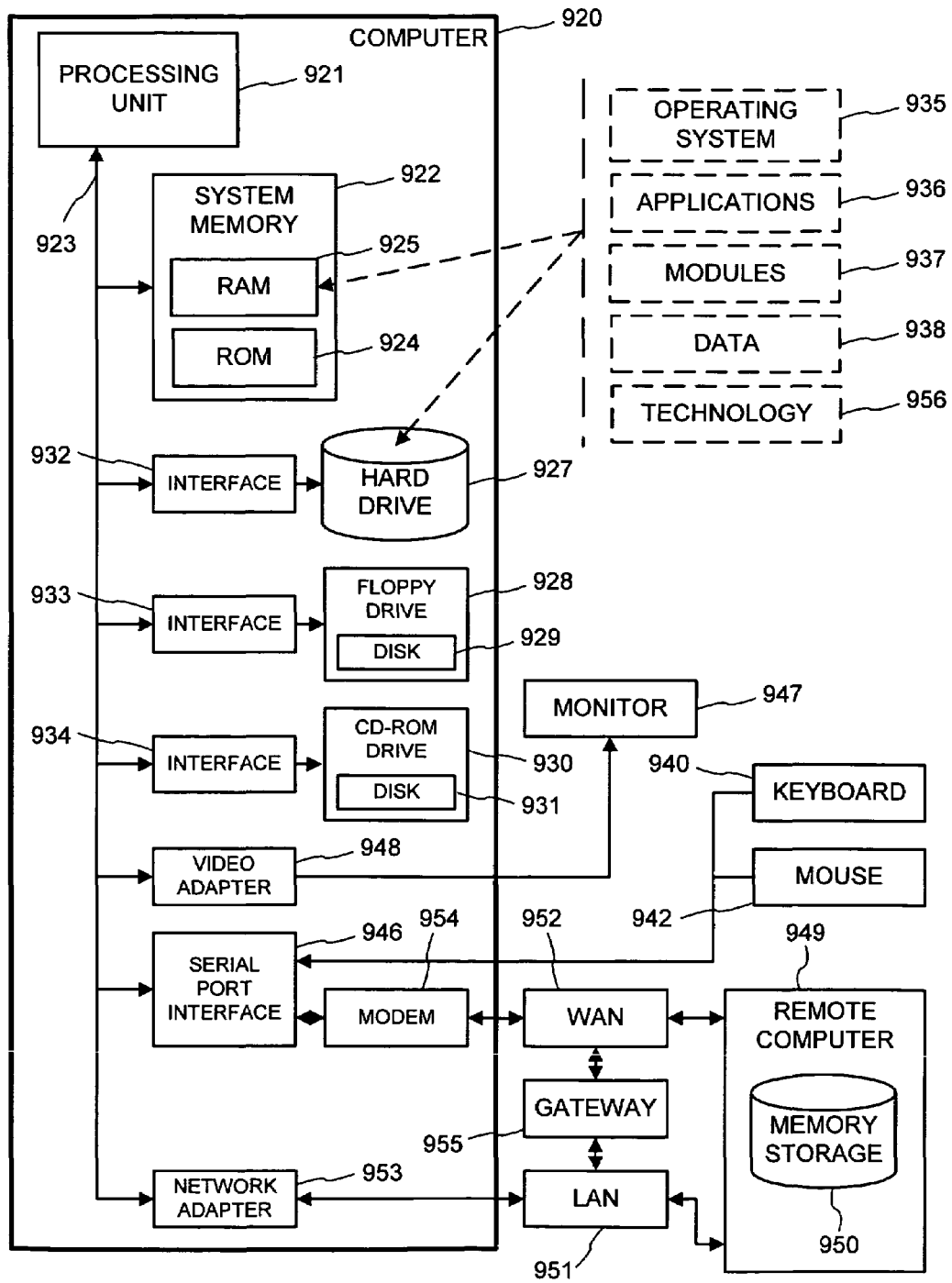
FIG. 9 is a block diagram of a distributed computer system implementing the described technologies.

FIG. 9 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 9, an exemplary system for implementation includes a conventional computer 920 (such as personal computers, laptops, servers, mainframes, and other variety computers) includes a processing unit 921, a system memory 922, and a system bus 923 that couples various system components including the system memory to the processing unit 921. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 921.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 924 and random access memory (RAM) 925. A basic input/output system (BIOS), containing the basic routines that help to transfer information between elements within the computer 920, such as during start-up, is stored in ROM 924.

The computer 920 further includes a hard disk drive 927, a magnetic disk drive 928, e.g., to read from or write to a removable disk 929, and an optical disk drive 930, e.g., for reading a CD-ROM disk 931 or to read from or write to other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions, etc. for the computer 920. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 925, including an operating system 935, one or more application programs 936, other program modules 937, and program data 938, in addition to an implementation of the described technologies 956.

A user may enter commands and information into the computer 920 through a keyboard 940 and pointing device, such as a mouse 942. These and other input devices are often connected to the processing unit 921 through a serial port interface 946 that is coupled to the system bus, but may be connected by other interfaces, such as a parallel port, game port or a universal serial bus (USB). A monitor 947 or other type of display device is also connected to the system bus 923 via an interface, such as a video adapter 948. In addition to the monitor, computers typically include other peripheral output devices (not shown), such as speakers and printers.

The computer 920 operates in a networked environment using logical connections to one or more remote computers, such as a remote computer 949. The remote computer 949 may be a server, a router, a peer device or other common network node, and typically includes many or all of the elements described relative to the computer 920, although only a memory storage device 950 has been illustrated. The logical connections depicted include a local area network (LAN) 951 and a wide area network (WAN) 952. Such networking environments are commonplace in offices, enterprise-wide computer networks, intranets and the Internet.

When used in a LAN networking environment, the computer 920 is connected to the local network 951 through a network interface or adapter 953. When used in a WAN networking environment, the computer 920 typically includes a modem 954 or other means for establishing communications (e.g., via the LAN 951 and a gateway or proxy server 955) over the wide area network 952, such as the Internet. The modem 954, which may be internal or external, is connected to the system bus 923 via the serial port interface 946. In a networked environment, program modules depicted relative to the computer 920, or portions thereof, may be stored in the remote memory storage device. It will be appreciated that the network connections shown are exemplary and other means of establishing a communications link between the computing devices may be used, wireless or otherwise.

Alternatives

Having described and illustrated the principles of our invention with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

We claim:

1. A computer implemented method of providing varying levels of detail in terrain rendering, the method comprising:
    providing representations of plural levels of detail of a terrain, where each level represents a regular grid;
    determining a viewpoint of a viewer;
    caching a terrain view in a set of nested regular grids obtained from the plural levels as a function of distance from the viewpoint, each regular grid having a two-dimensional array of vertices, the number of vertices in each dimension of size n;
    determining transition regions as of boundary grids within each of the nested regular grids, the transition regions width w determined by the equation w=min(n/10, min_width) and wherein min_width>=2;
    rendering the set of nested regular grids; and
    incrementally refilling the set of nested regular grids as the viewpoint moves relative to the terrain;
    wherein vertices of a regular grid comprise x, y, z, and $z_c$ coordinates, wherein z coordinates represent terrain elevation values for a level and $z_c$ coordinates represent terrain elevation values of a next coarser level, and the $z_c$ value is used in the transition region in transition morphing between adjacent levels of the set of nested regular grids such that a z' value is used to represent the terrain elevation at each x, y coordinate in the transition region, and the z' coordinate is determined by an equation z'=$(1-\alpha)z+\alpha z_c$, where $\alpha$ is a blend parameter that evaluates from zero to one in the transition region so as to facilitate smooth blending between levels;
    and wherein the transition morphing is calculated in a graphical processing unit via a vertex shader.

2. The method of claim 1 wherein the set of nested regular grids are cached in video memory.

3. The method of claim 1 wherein the nested regular grids are two-dimensional extents, each dimension of the size n, centered about the viewpoint.

4. The method of claim 3 wherein levels of the set of nested regular grids are blended in a transition region ranging from zero to twenty-five percent of n.

5. The method of claim 1 wherein the representations of plural levels of detail of the terrain comprise terrain elevation and texture images.

6. The method of claim 1 wherein a level of the set of nested regular grids is loaded into and cached as vertex buffers in video memory prior to the transition morphing.

7. The method of claim 6 wherein the two-dimensional array associated with the level is accessed toroidally during rendering.

8. The method of claim 1 wherein a normal map is computed from the geometry of a level when the set of nested regular grids are incrementally refilled.

9. A computer system comprising:
    a central processing unit;
    a graphical processing unit; and
    the processing units coupled to memory containing data and executable instructions comprising,
    representations of plural levels of regular grids, each level representing a terrain at various levels of detail, wherein plural vertices of the regular grids comprise x, y, z, and $z_c$ coordinates, wherein z coordinates represent terrain elevation values for a level detail and $z_c$ coordinates represent the z coordinate at the x, y coordinates for a next level of detail, representations of at least one transition region associated with the plural levels of regular grids, the transition region near the outer boundary of at least one of the regular grids; wherein the $z_c$ and z values are used in connection with a blending value α that evaluates from zero to one in transition morphing in the transition region to determine a z' value that ranges between z and $z_c$ to represent the terrain elevation at a corresponding x, y coordinate in the transition region, the z' value determined by an equation $z'=(1-\alpha)z+\alpha z_c$, wherein the plural levels of regular grids are two-dimensional arrays of vertices, each dimension within a level of size n, wherein the representation of the at least one transition region within the level is of width w determined by an equation w=min(n/10, min_width) and wherein min_width>=2, and the transition morphing z' calculation occurs in a graphical processing unit; and a rendering component comprising executable instructions for nesting portions of the plural levels into a set of nested regular grids reducing in level of detail as a function of distance from a viewpoint.

10. The computer system of claim 9 wherein the plural levels of regular grids further comprise texture images.

11. The computer system of claim 9 wherein the rendering component further comprises executable instructions for blending between levels of the set of nested regular grids.

12. The computer system of claim 11 wherein the rendering component further comprises executable instructions for incrementally refilling the set of nested regular grids as the viewpoint moves relative to the terrain.

13. The computer system of claim 12 wherein the rendering component further comprises executable instructions for creating a normal map for terrain shading when the set of nested regular grids are incrementally refilled.

14. A computer-readable medium comprising computer executable instructions for performing a method comprising:

providing representations of plural regular grids comprising various levels of detail of a terrain;

determining a viewpoint relative to the terrain;

creating a set of nested regular grids selected from the plural regular grids such that the nested regular grid levels degrade in level of detail as the distance from the viewpoint increases, wherein the regular grids are two-dimensional each dimension equally sized; and within the set of nested rectangular grids, creating transition regions, the transition regions near the outer boundary of the regular grids, and wherein at least one transition region of a given regular grid is of width w determined by an equation w=min(n/10, min_width), wherein min_width>=2, and wherein n=the dimension size of the region;

wherein vertices of at least one regular grid comprise x, y, z, and $z_c$ coordinates, wherein z coordinates represent elevation values for a level, $z_c$ coordinates represent terrain elevation values of a logically adjacent level, and the $z_c$ value is used in combination with the z value and a blending value α in transition morphing within the transition region associated with the at least one regular grid, such that a z' coordinate is used to represent the terrain elevation at each x, y coordinate in the transition region, and the z' coordinate is determined by an equation $z'=(1-\alpha)z+\alpha z_c$.

15. The computer-readable medium of claim 14, wherein the method further comprises:

blending terrain elevation values between levels of the set of nested regular grids such that elevation values in a finer detail level approach the levels of a coarser detail level at level boundaries.

16. The computer-readable medium of claim 14 wherein the method further comprises incrementally refilling the set of nested regular grids as the viewpoint moves relative to the terrain.

17. The computer-readable medium of claim 16 wherein each level contained in the set of nested regular grids is a two-dimensional regular grid, each dimension of size n, each level decreasing at successive power-of-two resolutions.

18. The computer-readable medium of claim 14 wherein the logically adjacent level is a next coarser level.

19. The computer readable medium of claim 14 wherein the transition morphing comprises a portion of the vertices transitioning to downsampled values of a next coarser logically adjacent level.

* * * * *